Oct. 21, 1930.   A. J. MUSSELMAN   1,779,244
METHOD OF MAKING TIRES
Filed Oct. 4, 1929

Inventor
Alvin J. Musselman

By

Attorney

Patented Oct. 21, 1930

1,779,244

UNITED STATES PATENT OFFICE

ALVIN J. MUSSELMAN, OF AKRON, OHIO

METHOD OF MAKING TIRES

Application filed October 4, 1929. Serial No. 397,390.

This invention relates to pneumatic tires, and it has particular relation to methods of assembling the plies and bead elements of balloon tires.

The principal object of the invention is to provide a method of substituting permanent beads for temporary beads to insure proper adhesion of the bead elements to the plies of the tire building material in tires which have relatively small or minimum inner diameters.

In building one kind of flat-built tire, a cylindrical band is provided which is shaped by shirring or gathering looped edges of the band upon bead elements, and then inflating a shaping member therein. It is necessary permanently to clamp, splice or otherwise secure the ends of such elements after the edges of the band have been gathered. These elements are in the form of metallic rings having gaps therein, wires, or cords. Although arrangements of this kind are convenient, they are somewhat disadvantageous because the resulting bead construction is not uniform circumferentially, and it is difficult to secure a permanent union between the bead elements and the edges of the tire bands through which they have been threaded. Moreover, in securing the ends of the bead elements, which are not continuous, flaws are likely to occur in the connections.

According to this invention, the edges of an endless or cylindrical band are shirred or gathered until they assume a relatively small diameter and subsequently a permanent bead element is applied thereto. It is preferable to insert a temporary bead element upon which the band edges may be gathered, and after the band has been shaped the permanent bead is substituted therefor.

For a better understanding of the invention, reference may now be had to the accompanying drawings, forming a part of the specification, of which;

Figure 1:
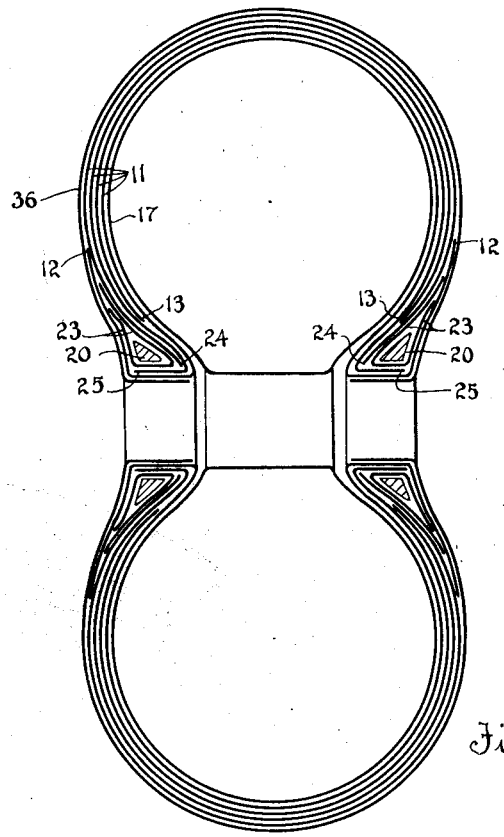
Figure 1 is a cross-sectional view of a tire constructed according to the invention.
Figure 2:
Figure 2 is a cross-sectional view of a laminated bead of tire building material, from which the tire is shaped.

In practicing the invention, an endless band 10 is provided which is composed of plies 11 of rubberized cord or fabric tire building material. A plurality of plies are lapped back upon the body of the band, as indicated at 12 and 13, thereby providing loops 14 at the opposite edges of the band. The edges of the band defining the loops 14 are gathered inwardly, preferably about temporary bead elements 15, which are threaded through slits 16 cut through the loops.

Figures 3, 4:
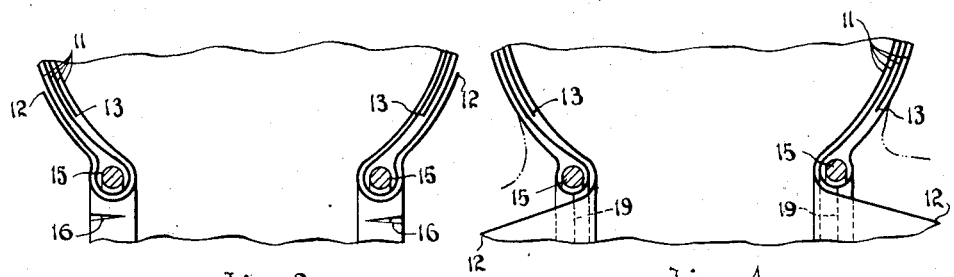
Figure 3 is a fragmentary cross-sectional view of the bead portions of the tire at an intermediate stage of the method of building it.
Figure 4 is a fragmentary cross-sectional view of the bead portions of a tire at another intermediate stage of the method.

An inflatable member 17, inserted within the band, is supplied with fluid under pressure for the purpose of shaping the band into the form shown by Figure 1; then by applying to the band edges suitable material, such as hydrocarbon, to loosen the lapped portions 12, the latter are drawn away from the body of the band, as indicated by Figure 4.

An inner ply 11, from which the edge portions 12 have been disengaged, is then slit circumferentially adjacent the bead elements 15 substantially along lines 19, thus exposing the temporary bead which is removed without difficulty. Permanent beads 20, having anchoring strips 23 disposed thereabout, are inserted to replace the temporary beads, and the edges defining the slit portions of the band are secured to the inner sides of the beads 20, one edge terminating at the toe of the bead, as indicated at 24, while the other edge terminates at the heel of the bead, as indicated at 25. The edge portions 12 are then lapped about the outer portion of the bead 20 and stitched to the anchoring strips 23 and to the side walls of the band. The tire in this form is provided with a tread covering 26 and vulcanized according to well known methods.

Although I have illustrated only one form which the invention may assume and have described that form in detail, it will be apparent to those skilled in the art that the invention is not so limited but that various modifications may be made therein without departing from the spirit of the invention or from the scope of the appended claims.

What I claim is:

1. A method of building tires which comprises lapping the edge portions of a laminated band of tire building material to form edge loops, inserting temporary bead elements through the loops, gathering the looped edge portions upon the bead elements, disengaging an outer laminated portion from the edge of the band adjacent the bead, slitting an inner laminated portion adjacent the bead, and substituting permanent bead elements for the temporary bead elements.

2. A method of building tires which comprises lapping the edge portions of a plurality of endless laminated plies of tire building material to form edge loops, gathering the edge loops upon temporary bead elements, shaping the plies into tire form, disengaging the edge portions of the outer ply from the other plies, slitting the remainder of the plies to expose the temporary bead elements, substituting permanent beads for the temporary bead elements, and securing the disengaged outer ply about the permanent bead.

3. A method of building tires which comprises lapping the edge portions of a plurality of endless laminated plies of tire building material to form edge loops, gathering the edge loops upon temporary bead elements, shaping the plies into tire form, disengaging the edge portions of the outer ply from the other plies, slitting the remainder of the plies to expose the temporary bead elements, substituting permanent beads for the temporary beads, securing the split portions in one direction about each permanent bead, and securing the disengaged portion in looped relation about the permanent bead and to the sides of the plies adjacent thereto.

In witness whereof, I have hereunto signed my name.

Signed at Akron, in the county of Summit and State of Ohio, U. S. A., this 30th day of September, 1929.

ALVIN J. MUSSELMAN.